United States Patent [19]

Laganis et al.

[11] 4,261,873

[45] Apr. 14, 1981

[54] PHENOLIC RESIN-TRIAZINE MODIFIER FOR OIL-FREE FATTY ACID-FREE POLYESTER RESINS

[76] Inventors: Deno Laganis, 2331 Algonquin Rd., Schenectady, N.Y. 12309; Eric V. Garis, R.D. 2 Closson Rd., Scotia, N.Y. 12302

[21] Appl. No.: 91,244

[22] Filed: Nov. 2, 1979

Related U.S. Application Data

[63] Continuation-in-part of Ser. No. 934,795, Aug. 17, 1978, Pat. No. 4,196,109.

[51] Int. Cl.$^3$ .......................... C09D 3/52; C09D 3/56; C09D 3/66
[52] U.S. Cl. .......................... 260/29.2 E; 260/29.2 N; 428/458; 428/460; 525/441; 525/442
[58] Field of Search ..................... 260/29.2 E, 29.2 N; 525/441, 442

[56] References Cited

U.S. PATENT DOCUMENTS

| | | | |
|---|---|---|---|
| 3,080,331 | 3/1963 | Thielking | 260/20 |
| 3,108,083 | 10/1963 | Laganis | 260/14 |
| 4,004,063 | 1/1977 | Peterson et al. | 428/383 |
| 4,133,787 | 1/1979 | Laganis et al. | 260/29.2 E |
| 4,179,420 | 12/1979 | Laganis | 260/29.2 E |
| 4,196,109 | 4/1980 | Laganis et al. | 260/20 |

*Primary Examiner*—Ronald W. Griffin
*Attorney, Agent, or Firm*—Cushman, Darby & Cushman

[57] ABSTRACT

The polyester composition comprises an oil-free and a fatty acid-free polyester, modified by a phenolic resin and a triazine derivative or resin. Varnishes of these compositions exhibit excellent hydrolytic stability.

15 Claims, No Drawings

PHENOLIC RESIN-TRIAZINE MODIFIER FOR OIL-FREE FATTY ACID-FREE POLYESTER RESINS

CROSS-REFERENCE TO RELATED APPLICATIONS

This application is a continuation-in-part of our copending application Ser. No. 934,795, filed Aug. 17, 1978, now U.S. Pat. No. 4,196,109, issued Apr. 1, 1980, which is relied upon and incorporated by reference herein.

This invention is directed to new, improved compositions for use as impregnating varnishes in electrical insulation applications, as well as in coreplate and other industrial coating areas.

BACKGROUND OF THE INVENTION

In the past, oil- or fatty acid-free polyesters exhibited poor hydrolytic stability, both at ambient and elevated temperatures. This shortcoming was most pronounced when the polyester was the sole polymeric component in a coating composition but even persisted in those compositions which, in addition to the oil-free polyesters, contained other resinous components that served as curatives. To prepare a polyester that was soluble in water alone, or when admixed with a cosolvent in water, posed an even more difficult problem.

To achieve solubility in an aqueous system it was necessary to prepare a carboxy-terminated oil-free polyester with an acid number ranging from 20 to 100 which could subsequently be solubilized by the addition of a tertiary amine alone or in combination with a cosolvent. Furthermore, to develop an insulating varnish with a Class F or Class H thermal rating, polyesters were derived principally from aromatic polycarboxylic acids or anhydrides that would provide a high order of thermal and hydrolytic stability. In addition to thermal and hydrolytic stability of those polyesters, the art considered the requirement of storage stability of these polyesters.

Polyesters made from isophthalic acid, terephthalic acid or an admixture of the two, in the absence of any other carboxylic acid, generally had to be reacted to an acid number of less than 20 to first provide a clear hot melt and then a clear cold melt or clear hard resin; these would not be subsequently soluble in an aqueous system. When the acid number of those polyesters ranged from 20–100, unreacted acid would result in hazy or cloudy hot and cold melts. Use of these polyesters could result in a hazy aqueous varnish with subsequent serious performance deficiency, and solution instability during storage.

In accordance with the invention, it was discovered that the preparation of polyesters with certain solubilizing reactants which react readily at relatively low processing temperatures of 150° to 200° C. produce polyesters of relatively high acid numbers, characterized by hot and cold melt clarity, and by excellent aqueous solubility characteristics. These polyesters, compounded with phenolic resins and triazine derivatives provide coatings that have a high order of bond strengths, moisture resistance, electrical and mechanical properties.

A stringent test for determining the degree of moisture resistance of a cured varnish film involves exposing the film to conditions of the Moisture Test Method undertaken at 70° C. and 100% relative humidity with dew for a period of 168 hours, or one week, followed by measurement of electrical resistance in megohms. Under these test conditions only those coatings which exhibited electrical resistance of 20,000 megohms, and preferably higher, after 168 hours of exposure were considered acceptable.

U.S. Pat. No. 4,004,063 describes a specific oil-free polyester of the isophthalate type which includes trimellitic anhydride in a specified 7 to 14 mole percent range. Polyesters of U.S. Pat. No. 3,108,083 with high mole percentages of TMA do not have the necessary moisture resistance and bond strengths achieved by the present invention, probably because of the absence of an aromatic dicarboxylic acid and the requisite phenolic resin in the final varnish composition to achieve this high order of properties.

OBJECTS OF THE INVENTION

It is an object of the present invention to provide an aqueous oil-free polyester composition for varnishes having improved high temperature properties.

Another object is to provide aqueous insulating varnishes containing these oil-free polyesters having a class F or higher rating which can be applied over wires coated with a Class F or H wire enamel.

A further object is to provide varnishes of high bond strengths, especially hot bonds at 150° C. of 5-lbs. or higher, and exceeding those obtained with epoxy coatings.

Another object is to provide an aqueous varnish which provides baked films of moisture resistance values in excess of 20,000 megohms after 168 hours of exposure at 100% relative humidity plus dew.

Another object is to provide an aqueous varnish that exhibits greater thermal stability and oxidation-resistance than those products containing unsaturated fatty acids or oils.

Still further objects of the present invention will become apparent from the description which follows.

SUMMARY OF THE INVENTION

The invention resides in a composition comprising the following components in the respective amounts based on the weight percentage of each of the total coating solids:

|  | Weight % |
|---|---|
| Oil- or Fatty Acid-Free Polyester | 20–75 |
| Phenolic Resin | 60–20 |
| Triazine Derivative or Resin | 20–5 |

Preferably, the composition contains 25 to 65 weight percent of the oil-free or fatty acid-free polyester; 27 to 57 weight percent phenolic resin and 8 to 18 weight percent of the triazine derivative or resin.

The moisture resistance of baked films of varnishes formulated in accordance with the invention exceed 20,000 and preferably exceed 25,000 megohms when measured under the conditions of the Moisture Test Method.

The polyester resins are those of the saturated and unsaturated types consisting essentially of an isophthalate or terephthalate backbone and containing, as a solubilizing reactant, trimellitic anhydride (TMA); a cyclo- or bicycloaliphatic dicarboxylic acid or anhydride thereof which is optionally unsaturated; or an aliphatic unsaturated acid component, such as maleic, fumaric acid, or dimerized fatty acids.

The phenolic resin systems include a formaldehyde reaction product in which formaldehyde is reacted with a mixture comprising:

(1) an ortho (o-) or para (p-)-alkyl phenol,
(2) a polyhydroxyphenol and
(3) an ortho (o-) or para (p-)-hydroxy benzoic acid The triazine component may be a melamine or benzoguanamine derivative that is a reaction product of melamine or benzoguanamine and formaldehyde and that has two or more methylol groups that are left free, or preferably etherified with various alcohols to form derivatives thereof. Also these derivatives may be condensed to form resinous amino products.

DETAILED DESCRIPTION OF THE INVENTION

Polyester Component

One of the principal components of the impregnating type of insulating varnish is an oil- or fatty acid-free polyester. The polyester is a reaction product of a dihydric alcohol, a polyhydric alcohol or a combination thereof and of an aromatic dicarboxylic acid, such as isophthalic acid or terephthalic acid, and a solubilizing reactant, such as trimellitic anhydride, a cyclo-or bicycloaliphatic dicarboxylic acid or anhydrides thereof, that react readily and provide a polyester with many carboxylic acid group sites for subsequent solubilization in aqueous media.

The polyesters can be prepared by a variety of processes. One is a two-stage process and is most preferred. In the first stage a variety of aromatic dicarboxylic acids are pre-esterified with a mixture of diols and triols or diols alone to form a polyester prepolymer. In the second stage an aromatic or aliphatic tricarboxylic acid or preferably its anhydride, a cycloaliphatic dicarboxylic acid or its anhydride, or an aliphatic acid or its anhydride, or various mixtures thereof are added to the prepolymer as solubilizing reactants and are reacted at temperatures ranging from 150° to 200° C. until an acid number of 20 to 100 on the solid resin is attained.

In another method all reactants are introduced together into a reaction vessel and reacted at temperatures of 100° to 230° C. until an acid number of 20 to 100 on the solid resin is achieved.

The hydroxyl (OH) to carboxyl (COOH) ratio (OH/-COOH) on an equivalent basis may range from 1/1 to 1.7/1, in these oil-free or fatty acid-free polyesters.

The esterification or condensation reaction is followed by measuring the viscosity of a sample at a certain solid content in a specific solvent. The acid number on this diluted sample is determined by titrating it with an alcoholic or aqueous solution of potassium hydroxide (0.1 N KOH) to determine the milligrams of KOH equivalent to the acidity of one gram of resin. When the desired reaction endpoint in terms of viscosity and acid number is reached, the polyester is cooled to 150° C., and subsequently thinned or dissolved in a cosolvent, such as a glycol ether, to about 65 to 90% solids to form the polyester concentrate.

Polyesters are reaction products of polyhydric alcohols and polycarboxylic acids. The various reactants employed in their preparation are described below.

Polyhydric Alcohols

The triols and tetraols that are preferred are: trimethylolpropane, trimethylolethane, tris(hydroxyethyl) isocyanurate, glycerine, and pentaerythritol.

The dihydric alcohols or diols that are preferred are: neopentyl glycol, dimethylol hydantoin, ethylene glycol, propylene glycol, 1,3-butylene glycol, diethylene glycol, dipropylene glycol, 1,4-cyclohexane dimethanol, Esterdiol 204 (trademark of Union Carbide), and 1,6-hexanediol.

CARBOXYLIC ACIDS

The preferred aromatic dicarboxylic acids are: isophthalic acid, terephthalic acid and benzophenone dicarboxylic acid.

A variety of solubilizing reactants for the second stage of the polyester cook may be employed. They are di-, tri- or tetracarboxylic acids or anhydrides of the cycloaliphatic, aliphatic or aromatic types or aromatic monocarboxylic acids and include the following:

DICARBOXYLIC ACIDS a. Cycloaliphatic—tetrahydrophthalic anhydride, hexahydrophthalic anhydride, 3,6-endo-methylene-4-tetrahydrophthalic anhydride, and 1,4-cyclohexanedicarboxylic acid.

b. Aliphatic—maleic acid or its anhydride, fumaric acid or its anhydride, adipic acid, azelaic acid, sebacic acid, succinic acid, glutaric acid, tetrapropenyl succinic anhydride, and dimer acids (a liquid $C_{36}$ aliphatic produced by the polymerization of unsaturated fatty acids).

TRI- OR TETRACARBOXYLIC ACIDS a. Aromatic—trimellitic acid or preferably its anhydride, pyromellitic anhydride, and benzophenone tetracarboxylic acid dianhydride.

b. Aliphatic—nitrilotriacetic acid.

Aromatic Monocarboxylic Acids—benzoic acid, o-, m- or p- toluene acid, and tertiary butyl benzoic acid.

The solubilizing carboxylic acid reactants can affect the nature and the amount of other components of the polyesters:

Use of tri- or tetracarboxylic acids or anhydrides, as the solubilizing reactants, can determine whether the polyhydric component is a combination of diols and triols or includes diols only.

Use of dicarboxylic acids or anhydrides, as solubilizing reactants, will affect the actual amount of solubilizing reagent used depending on whether it is of the cycloaliphatic type or of the aliphatic type.

If a tricarboxylic acid anhydride, such as trimellitic anhydride (TMA), is used as the solubilizing reactant, then to obtain varnish compositions with high moisture resistances, bond strengths and stable storage properties, the mole percent of TMA must exceed 14% of the total moles of polyester reactants present. As the mole percent of TMA exceeds 17%, there is no longer need for a triol or higher polyol to obtain a thermosetting polyester with excellent properties cited above. The mole percent of TMA may range from 15 to 25%, and preferably is 17–23%. Expressed in another way, the amount of TMA may range, in general, from 0.5 to 3 moles of TMA per mole of isophthalic or terephthalic acid; with the preferred range of 0.75 to 2 moles of TMA per mole of aromatic dicarboxylic acid. In TMA solubilized polyesters, the OH/COOH ratio, based on the hydroxyl and carboxylic equivalents present in the polyester formulation, ranges from 1.20/1 to 1.50/1, generally; the preferred range is 1.25/1 to 1.40/1.

When a cycloaliphatic dicarboxylic acid or its anhydride is used exclusively as the solubilizing reactant, the mole percent of cycloaliphatic dicarboxylic acid anhydride may range from 17 to 30% in general, and preferably from 20 to 28%. In terms of mole ratio, the mole ratio of cycloaliphatic dicarboxylic acid or its anhydride per mole of an aromatic dicarboxylic acid ranges from 0.65 to 2 moles, and preferably from 0.75 to 1.5.

If an aliphatic saturated dicarboxylic acid or its anhydride is used as a solubilizing reactant exclusively, it may be used in amounts ranging from 4 to 20 mole percent, and preferably from 5 to 15 mole percent. When employed in combination with another solubilizing reactant, such as TMA or THPA, the amount of aliphatic dicarboxylic acid may range from 3 to 15 mole percent, and preferably from 5 to 12 mole percent.

The OH/COOH ratio of polyesters prepared with cycloaliphatic dicarboxylic acids, aliphatic saturated dicarboxylic acids or anhydrides thereof as solubilizing reactants, may range from 1.10 to 1.50/1 and preferably from 1.15/1 to 1.40/1, and in these polyesters the incorporation of a triol is absolutely essential.

On a molar basis, the total amount of the diol, triol and polyol components will range from 45 to 80 mole percent, based on the total amount of carboxylic acids and/or anhydride used to form the composition of the invention, and thus the total amount of carboxylic acid will range from 55 to 20 mole percent. When a tricarboxylic acid anhydride, such as TMA, is used as the sole solubilizing agent, the amount of diol will range from 80 to 100 mole percent and the triol will range from 0-20 mole percent based on the total amount of diol and triol used to form the polyester. When the solubilizing reagent is THPA the amount of diol will range from 60 to 80 mole percent and the amount of triol will range from 40 to 20 mole percent based on the total amount of diol and triol used to form the polyester.

For those polyester compositions in which a tetracarboxylic acid anhydride is employed as solubilizing reactant in combination with an aromatic dicarboxylic acid the incorporation of an aromatic monocarboxylic acid, such as benzoic acid and its nuclear ring substituted acids, is necessary in order to limit excessive reactivity of the highly functional polycarboxylic acid.

Varnishes of polyesters formed from neopentyl glycol as the diol exhibited much better moisture resistance than formed from other diols. Thus, neopentyl glycol is the preferred diol. The preferred trihydric alcohols or triols are trishydroxyethylisocyanurate THEIC) and trimethylolpropane. The preferred aliphatic acid is dimer acid.

EXAMPLES

The examples of polyesters described hereafter serve to illustrate the invention, and they are not intended to limit its scope in any manner.

In Examples 1–6, TMA is employed as the sole solubilizing reactant, at various mole percentages. TMA is selected as a representative of a tricarboxylic acid mono-anhydride.

EXAMPLE 1

| Reactants | Wt. gms. | Equivalents | Moles or | Moles/ Moles IPA | Mole % |
|---|---|---|---|---|---|
| (A) Neopentyl Glycol (NPG) | 1019 | 19.60 | 9.80 | 1.40 | 46.7 |
| (B) Trimethyol Propane (TMP) | 251 | 5.62 | 1.87 | 0.27 | 8.9 |
| (C) Isophthalic Acid (IPA) | 1162 | 14 | 7 | 1.00 | 33.3 |
| (D) Trimellitic Anhydride (TMA) | 448 | 7 | 2.33 | 0.33 | 11.1 |
| OH/COOH: 1.20/1 | | | | | |

Materials (A), (B) and (C) are charged into a five-liter, three-neck round bottom flask equipped with a motor driven stainless steel paddle agitator, a thermometer to record batch temperature, a Synder fractionating column with a distillation head and thermometer, a condenser, and a receiver to collect the distillate. The mixture was stirred and a Glas-Col heating mantle served to heat the mixture. The temperature was gradually increased over a period of 3 to 6 hours to a temperature range of 200°–230° C., and maintained there until an acid number of 8.4 at 100% solids was obtained and 197 mls of distillate had been collected.

The contents of the flask were cooled to 150° C. and material (D) was added to the flask. At this point the fractionating column was replaced by a Dean-Stark water trap. Heating was resumed and the temperature was increased to 170°–180° C. and maintained there until a sample thinned to 65% solids in methoxy propanol had a viscosity of Z ½ on Gardner-Holdt scale and an acid number of 31.4 at this solids. The molten polymer was subsequently thinned to 80% at this solids in butoxy ethanol. This polyester concentrate was later compounded into various varnishes, as described below.

EXAMPLE 2

| Reactants | Wt. Gms. | Equivalents | Moles | Moles/ Moles IPA | Mole % |
|---|---|---|---|---|---|
| (A) Neopentyl Glycol | 1086 | 20.88 | 10.44 | 1.74 | 49.15 |
| (B) Trimethylol Propane | 241 | 5.40 | 1.80 | 0.30 | 8.48 |
| (C) Isophthalic Acid | 966 | 12 | 6 | 1.00 | 28.25 |
| (D) Trimellitic Anhydride | 576 | 9 | 3 | 0.50 | 14.12 |
| OH/COOH: 1.25/1 | | | | | |

In this example, the same equipment and processing technique as described in Example 1 were employed. The polyester was processed to an acid number of 26.4 at 100% solids in the first stage. In the second stage after the addition of material (D), it was reacted to a final viscosity of X and an acid number of 46.6 at this solids. A total of 240 mls. of distillate was collected. The molten polymer was subsequently diluted to 80% solids in butoxy ethanol. This polyester concentrate was compounded as a varnish, as described below.

EXAMPLE 3

| Reactants | Wt. Gms. | Equi-valents | Moles | Moles/ Moles IPA | Mole % |
|---|---|---|---|---|---|
| (A) Neopentyl Glycol | 1381 | 26.56 | 13.28 | 2.656 | 60.28 |
| (B) Isophthalic Acid | 830 | 10 | 5 | 1 | 22.70 |
| (C) Trimellitic Anhydride | 720 | 11.25 | 3.75 | 0.750 | 17.02 |
| OH/COOH: 1.25/1 | | | | | |

In this example, the same equipment and processing techniques were employed as in Example 1. The reaction mixture was processed to an acid number of 24.1 at 100% solids in the first stage, and in the second stage to a final viscosity of W at 65% NV in methoxy propanol and an acid number of 37.4 at this solids. A total of 228 mls. of distillate was collected. The polyester base was thinned to 80% solids in butoxy ethanol. Varnishes prepared with this polyester concentrate are described under the heading "Preparation of Coating Compositions" below.

EXAMPLE 4

| Reactants | Wt. Gms. | Equi-valents | Moles | Moles/ Moles IPA | Mole % |
|---|---|---|---|---|---|
| (A) Neopentyl Glycol | 1300 | 25 | 12.5 | 3.125 | 61.0 |
| (B) Isothalic Acid | 664 | 8 | 4 | 1 | 19.5 |
| (C) Trimellitic Anhydride | 768 | 12 | 4 | 1 | 19.5 |
| OH/COOH: 1.25/1 | | | | | |

The reaction mixture was reacted to an acid number of 28.4 at 100% solids in the first stage, and 126 mls. of distillate was collected. In the second stage it was bodied to a final viscosity of W at 65% solids in methoxy propanol and an acid number of 42.7. Another 18 mls. of distillate was collected, and the total distillate collected was 144 mls. The polyester was thinned to 80% solids in butoxy ethanol, and varnishes prepared therefrom are described in the "Coating Compositions" section below.

EXAMPLE 5

| Reactants | Wt. Gms. | Equi-valents | Moles | Moles/ Moles IPA | Mole % |
|---|---|---|---|---|---|
| (A) Neopentyl Glycol | 1298 | 24.96 | 12.48 | 4.16 | 62.5 |
| (B) Isophthalic Acid | 498 | 6 | 3 | 1 | 15 |
| (C) Trimellitic Anhydride | 864 | 13.50 | 4.50 | 1.50 | 22.5 |
| OH/COOH: 1.28/1 | | | | | |

The mixture was reacted to an acid number of 26.4 at 100% solids in the first stage, and 90 mls. of distillate was collected. In the second stage it was bodied to a final viscosity of Y at 65% solids in methoxy propanol and an acid number of 42.1 at this solids. Another 110 mls. of distillate was collected. The polyester was reduced to 80% solids with butoxy ethanol, and varnishes prepared therefrom are described under the heading "Coating Compositions" below.

EXAMPLE 6

| Reactants | Wt. Gms. | Equi-valents | Moles | Moles/ Moles IPA | Mole % |
|---|---|---|---|---|---|
| (A) Neopentyl Glycol | 1531 | 29.44 | 14.72 | 5.888 | 66.25 |
| (B) Isophthalic Acid | 415 | 5 | 2.50 | 1 | 11.25 |
| (C) Trimellitic Anhydride | 960 | 15 | 5 | 2 | 22.50 |
| OH/COOH: 1.47/1 | | | | | |

The reaction mixture was reacted to an acid number of 22.4 at 100% NV in the first stage and 69 mls. distillate was collected. In the second stage, polymerization was continued to a final viscosity of V ½ at 65% NV in methoxy propanol and an acid number of 35.7 at this solids content. Another 139 mls. distillate was collected. The polyester was dissolved in butoxy ethanol to a solids content of 80%, and varnishes prepared therefrom are described under the heading "Coating Compositions" below.

EXAMPLE 7

| Reactants | Wt. Gms. | Equi-valents | Moles | Moles/ Moles IPA | Mole % |
|---|---|---|---|---|---|
| (A) Neopentyl Glycol | 1498 | 28.80 | 14.4 | 8 | 66.67 |
| (B) Isophthalic Acid | 299 | 3.60 | 1.8 | 1 | 8.33 |
| (C) Trimellitic Anhydride | 1037 | 16.20 | 5.4 | 3 | 25 |
| OH/COOH: 1.455/1 | | | | | |

The mixture was reacted to an acid number 28.3 at 100% NV in the first stage, and 46 mls. distillate was collected. In the second stage, it was bodied to a final viscosity of W at 65% NV in methoxy propanol and an acid number of 39 at this solids content. Another 165 mls. distillate was collected. The base was thinned to 80% NV in butoxy ethanol. Varnishes prepared therefrom are described under the heading "Coating Compositions" below.

Examples 8–12 represent a series of polyesters wherein the reactants are all the same, differing in molar content of tetrahydrophthalic anhydride (THPA) based on moles of isophthalic acid (which is the parameter under study). These examples employed the same equipment and processing techniques as shown in Example 1. Formulations are described in Table 1.

When tetracarboxylic acid dianhydrides, such as pyromellitic dianhydride (PMDA) or benzophenone tetracarboxylic acid dianhydride (BPDA), are incorporated into a polyester, a monofunctional reactant, such as a monocarboxylic acid or an alcohol, is needed to moderate excessive reactivity. Since aromatic monocarboxylic acids provide a better approach to achieving better moisture resistance than either aliphatic monocarboxylic acids or alcohols, they were selected for further study.

Examples 13 and 14 illustrate the use of an aromatic monocarboxylic acid, such as benzoic acid, in combination with BPDA in Example 13 and PMDA in Example 14 with neopentyl glycol as the only hydroxyl-bearing reactant.

TABLE 1

| 1st Stage Reactants | Example 8 Wt. gms. | Moles No. | % | Example 9 Wt. gms. | Moles No. | % | Example 10 Wt. gms. | Moles No. | % | Example 11 Wt. gms. | Moles No. | % | Example 12 Wt. gms. | Moles No. | % |
|---|---|---|---|---|---|---|---|---|---|---|---|---|---|---|---|
| NPG (A) | 759 | 7.29 | 38.50 | 736 | 7.075 | 38.45 | 756 | 7.269 | 38.4 | 755 | 7.26 | 38.37 | 736 | 7.077 | 38.45 |
| IPA (B) | 996 | 6.00 | 31.70 | 830 | 5 | 27.17 | 746 | 4.500 | 23.8 | 664 | 4 | 21.14 | 581 | 3.500 | 19.02 |
| THEIC (C) | 689 | 2.64 | 13.95 | 672 | 2.575 | 14 | 693 | 2.655 | 14.0 | 695 | 2.66 | 14.06 | 672 | 2.575 | 14 |
| Acid No. on 100% NV | 30.6 | | | 30.6 | | | 26.9 | | | 27.1 | | | 28.5 | | |
| Distillate mls. | 158 | | | 144 | | | 132 | | | 107 | | | 94 | | |
| 2nd Stage D THPA | 456 | 3 | 15.85 | 570 | 3.750 | 20.38 | 684 | 4.500 | 23.8 | 760 | 5 | 26.43 | 798 | 5.250 | 28.53 |
| Visc. at 65% NV in MP* | V | | | V¼ | | | U¾ | | | V | | | U½ | | |
| Acid No. at 65% NV in MP | 37.4 | | | 33.4 | | | 31.9 | | | 33.7 | | | 34.5 | | |
| Distillate mls | 6 | | | 24 | | | 47 | | | 49 | | | 52 | | |
| Total Polyester Conc. | 164 | | | 168 | | | 179 | | | 156 | | | 146 | | |
| % NV in BE** | 80 | | | 80 | | | 80 | | | 80 | | | 80 | | |
| OH/COOH on equivs. | 1.25 | | | 1.25 | | | 1.25 | | | 1.25 | | | 1.25 | | |

*MP = methoxy propanol
**BE = butoxy ethanol

EXAMPLE 13

| | Reactants | Wt. gms. | Moles No. | % | Per Mol IPA |
|---|---|---|---|---|---|
| 1st Stage | NPG | 1138 | 10.94 | 59.32 | 4.375 |
| | IPA | 415 | 2.50 | 13.56 | 1 |
| Acid No. on 100% NV | | 24.3 | | | |
| Distillate, mls. | | 73 | | | |
| 2nd. Stage | Benzoic Acid | 305 | 2.50 | 13.56 | 1 |
| | BPDA | 402 | 1.25 | 6.78 | 0.500 |
| Acid No. on 100% NV | | 30.7 | | | |
| Distillate, mls. | | 80 | | | |
| 3rd. Stage | BPDA | 403 | 1.25 | 6.78 | 0.500 |
| Visc. @65% NV in MP | | Y¼ | | | |
| Acid No. @65% NV in MP | | 37.8 | | | |
| Distillate mls. | | 3 | | | |
| Total Polyester Conc. | | 156 | | | |
| % NV in BE | | 80 | | | |
| OH/COOH, on equivs. | | 1.25 | | | |

EXAMPLE 14

| | Reactants | Wt. gms. | Moles No. | % | Per Mol IPA |
|---|---|---|---|---|---|
| 1st. Stage | NPG | 1138 | 10.94 | 59.32 | 4.375 |
| | IPA | 415 | 2.50 | 13.56 | 1 |
| Acid No. on 100% NV | | 29.6 | | | |
| Distillate mls. | | 72 | | | |
| 2nd. Stage | Benzoic Acid | 305 | 2.50 | 13.56 | 1 |
| | PMDA | 109 | 1.25 | 6.78 | 0.500 |
| Acid No. on 100% NV | | 35.9 | | | |
| Distillate, mls. | | 90 | | | |
| 3rd. Stage | PMDA | 109 | 1.25 | 6.75 | 0.500 |
| Visc. @65% NV in MP | | Z¼+ | | | |
| Acid No. @65% NV in MP | | 26.4 | | | |
| Distillate mls. | | 61 | | | |
| Total Polyester Conc. | | 223 | | | |
| % NV in BE | | 80 | | | |
| OH/COOH, on equivs. | | 1.25 | | | |

Where an aliphatic dicarboxylic acid is employed, it may be used as the sole solubilizing reactant, or in combination with TMA or THPA. In examples 15 and 16 an aliphatic dicarboxylic acid is used as the sole solubilizing reactant.

EXAMPLE 15

| | Reactants | Wt. Gms. | Moles or | Moles/ Moles IPA | Mole % |
|---|---|---|---|---|---|
| 1st Stage | NPG | 596 | 5.73 | 1.43 | 31.12 |
| | IPA | 664 | 4 | 1 | 21.73 |
| | THEIC | 961 | 3.68 | 0.92 | 19.99 |
| Acid No. on 100% NV | | 28.7 | | | |
| Distillate mls. | | 74 | | | |
| 2nd Stage Adipic Acid | | 730 | 5 | 1.25 | 27.16 |
| Visc. at 65% | | | | | |

-continued

| Reactants | Wt. Gms. | Moles or | Moles/ Moles IPA | Mole % |
|---|---|---|---|---|
| NV in MP | V½ | | | |
| Acid No. at 65% NV in MP | 24.3 | | | |
| Distillate mls. | 161 | | | |
| mls. total Polyester Conc. | 235 | | | |
| % NV in BE OH/COOH on equivs. | 80 1.25 | | | |

-continued

| Reactants | Wt. Gms. | Moles or | Moles/ Moles IPA | Mole % |
|---|---|---|---|---|
| equivs. | 1.25 | | | |

In Examples 17, 18 and 19 in Table 2 a combination of solubilizing reactants, namely TMA and dimer acids, are employed. In this series dimer acids replace a portion of the isophthalic acid at 20, 30 and 40 mole %, respectively of the latter. The intention is to produce a tougher, more flexible varnish and to determine the effect of the additional solubilizing reactants on moisture resistance, bond strengths, and in thick varnish areas.

TABLE 2

| | Reactants | Example 17 Wt. gms. | Moles No. | % | Example 18 Wt. gms. | Moles No. | % | Example 19 Wt. gms. | Moles No. | % |
|---|---|---|---|---|---|---|---|---|---|---|
| 1st Stage | NPG | 1300 | 12.5 | 60.98 | 1023 | 9.84 | 59.13 | 1079 | 10.37 | 61.25 |
| | Dimer Acids | 480 | 0.8 | 3.90 | 720 | 1.20 | 7.21 | 908 | 1.50 | 8.86 |
| | IPA | 531 | 3.2 | 15.61 | 465 | 2.80 | 16.83 | 374 | 2.25 | 13.29 |
| Acid No. at 100% NV | | 24.1 | | | 25.7 | | | 26.4 | | |
| Distillate mls. | | 118 | | | 102 | | | 110 | | |
| 2nd Stage | TMA | 768 | 4.0 | 19.51 | 538 | 2.80 | 16.83 | 540 | 2.81 | 16.60 |
| Visc. at 65% NV in NMP | | V½ | | | V+ | | | Q¼ | | |
| Acid No. at 65% NV in MP | | 33.2 | | | 21.9 | | | 24.2 | | |
| Distillate mls | | 107 | | | 78 | | | 74 | | |
| mls total Polyester Concentrate | | 225 | | | 180 | | | 184 | | |
| % NV in BE OH/COOH, on equivs. | | 80 1.25 | | | 80 1.20 | | | 80 1.30 | | |

EXAMPLE 16

| Reactants | Wt. Gms. | Moles or | Moles/ Moles IPA | Mole % |
|---|---|---|---|---|
| 1st Stage NPG | 596 | 5.73 | 1.43 | 31.12 |
| IPA | 664 | 4 | 1 | 21.73 |
| THEIC | 961 | 3.68 | 0.92 | 19.99 |
| Acid No. on 100% NV | 30 | | | |
| Distillate mls. | 102 | | | |
| 2nd Stage Azelaic Acid | 940 | 5 | 1.25 | 27.16 |
| Visc. at 65% NV in MP | R− | | | |
| Acid No. at 65% NV in MP | 31.5 | | | |
| Distillate mls. | 141 | | | |
| mls. total Polyester Conc. | 243 | | | |
| % NV in BE OH/COOH on | 80 | | | |

PHENOLIC RESIN COMPONENT

The phenolic resin component is an important component of the coating composition and one which contributes to high bond strengths and high moisture resistance. The phenolic resins employed here act as coreactants with the oil-free polyesters and are of the alkyl-substituted phenolformaldehyde types.

The phenolic resin system includes a formaldehyde reaction product in which formaldehyde is reacted with a mixture of phenols comprising:

(1) an ortho (o-) or para (p-) - alkyl phenol
(2) a polyhydroxyphenol and
(3) an ortho (o-) or para (p-) - hydroxy benzoic acid The phenolic resin component is similar in composition to phenol resins described in Laganis et al, U.S. Application Ser. No. 934,795, which is incorporated by reference herein and also includes those described in Table 3 below. The ortho- or para-alkyl phenol comprises 50 to 90 mole percent of the mixture of phenols, while the polyhydroxyphenol is present in an amount ranging from 3 to 20 mole percent and the ortho- or para-hydroxy benzoic acid is present in an amount ranging from 7 to 40 mole percent of said mixture of phenols.

The alkyl of the ortho- or para- alkyl phenol of the mixture of phenols contains 1 to 12 carbon atoms and is straight chain or branched and may be any alkyl phenol described in copending Ser. No. 934,795 which is incorporated by reference herein and those described below.

Example 20 is similar to Example 16 of Laganis et al U.S. Application Ser. No. 934,795 in composition and in the method of its preparation. In Example 21 phenolphthalein is employed as one of the phenols. In Example 22 resorcinol was used as one of the polyhydroxyphenols. In Examples 23 and 24, p-sec. butylphenol and p-phenylphenol are employed, respectively, in lieu of p-t-butylphenol as in Example 20. The procedures and methods of preparation of the phenolic resin are the same as those described in the U.S. Application Ser. No. 934,795 which has been incorporated by reference herein.

From Table 9, the effect of various phenolic resins in coating compositions, containing polyester of Example 10 as the standard polymer, on moisture resistance and bond strengths can be seen. At the 50% phenolic resin level (solids basis) all the coatings had bond strengths of a high order, but exhibited wide differences in moisture resistance. The composition of Example 23 exhibited a moisture resistance of less than 20,000 megohms. The composition of Example 24 was not tested because of its poor coatability on brass rods and copper panels.

TABLE 3

| Phenolic Resin | Phenolic Resin Compositions | | | | |
|---|---|---|---|---|---|
| | Example 20 | Example 21 | Example 22 | Example 23 | Example 24 |
| Mole % of Phenols | | | | | |
| Alkyl Phenols | | | | | |
| p-t-butyl phenol | 71.7 | 71.7 | 71.7 | | |
| p-sec. butyl phenol | | | | 71.7 | |
| Arylphenols | | | | | |
| p-phenyl phenol | | | | | 71.7 |
| Polyhydroxy phenols | | | | | |
| 2-2-bis (4-hydroxyphenyl) propane | 7.4 | | | 7.4 | 7.4 |
| phenolphthalein | | 7.4 | | | |
| resorcinol | | | 7.4 | | |
| Carboxyphenols | | | | | |
| Salicylic Acid | 20.9 | 20.9 | 20.9 | 20.9 | 20.9 |
| Formaldehyde/ phenols, Mole Ratio | 1.9 | 1.9 | 1.9 | 1.9 | 1.9 |
| Solution Properties | | | | | |
| Visc. at 25° C. (G-H Scale) | Y-Z | Y-Z | Z2-Z3 | W | Z1-Z2 |
| % Solids | 76 | 76.1 | 79.5 | 75 | 81.7 |
| Solvent | BE* | BE* | BE* | BE* | BE* |

BE*: butoxy ethanol

Save for the phenolic resin of Example 24, all the other phenolic resins were compounded with the polyester of Example 11 as indicated in Table 8, and with the polyester of Example 12 as indicated in Table 9. In all instances, high bond strengths were obtained at two levels of phenolic resin content, and all exceeded the minimum moisture resistance value of 20,000 megohms.

TRIAZINE DERIVATIVE COMPONENT

The triazine component is a condensation product of a melamine or benzoguanamine with formaldehyde and contains two or more free methylol groups or partially or fully etherified derivatives of those methylol groups. A variety of alcohols may be used to etherify the methylol groups. These products may be used as monomers or low molecular weight polymers possessing water solubility.

Triazine products of the invention with free methylol groups (hydroxyl group) in the free or non-etherfied state provide varnishes with excellent properties, but exhibit decreased package or storage stability compared to their etherified derivatives. Speed of condensation or cure of compositions containing triazines in which the methylol group are etherified increases with increasing volatility of the alcohol used to form the ether derivative of the triazine aminoplast. Methanol is more volatile than n-butanol, and, thus, those aminoplast crosslinkers, formed with methanol as the etherifying agent in hexamethoxymethylmelamine, have a faster cure response than those prepared with butanol.

Acid carboxyl groups in the polyester coreactant act as "built in" catalysts in hastening crosslinking with the aminoplast and phenoplast components used in the production of compositions of the invention.

Generally, the methylated derivatives of melamine or benzoguanamine-formaldehyde adducts cure faster, provide better compatibility with other coreactants, are more soluble in water, and confer greater chemical resistance to the final baked film. Due to the greater functionality of the melamine type of crosslinkers, melamine triazine components result in compositions of better hardness, bond strengths and moisture resistance than those compositions containing benzoguanamine crosslinkers.

The triazine derivatives most preferred are the hexamethoxymethyl melamines (HMMM) or mixed methyl/ethyl, mixed methyl/isopropyl or methyl/butyl ethers thereof. Aminoplast level ranging from 5 to 20% of the total vehicle solids provide excellent moisture resistance and bond strengths. The preferred range is 8 to 18% of the aminoplast based on the total vehicle solids.

PREPARATION OF AQUEOUS COATING COMPOSITIONS

Use of Cosolvents

To solubilize these inherently water-insoluble resinous coating compositions, the oil-free polyester and the phenolic resin are separately predissolved in cosolvents to a solids level ranging from 50 to 90% to facilitate the preparation of the final coating. Other techniques of coating preparation may be employed whereby the molten polyester is added to a mixture of water, amine, cosolvent, aminoplast and phenolic resin and carefully adjusted to the desired specifications.

In order to facilitate the compounding of coatings the polyester is diluted to 80% solids with a cosolvent to form a high solids solution or concentrate. The phenolic resin is treated in the same manner, except that its solids may range from 50 to 80%. The aminoplast is used at 80 to 100% solids, and its solvent may vary from water to a variety of primary, secondary or tertiary alcohols.

The incorporation of a polar solvent, as a component of a water/cosolvent blend, enhances the solubility of these coating compositions which may not be soluble in a water/amine mixture alone. The cosolvent not only aids the storage or package stability of the coating, but enhances the flow of the liquid film so that a smooth, continuous baked film is obtained.

Typical polar solvents that are incorporated into the coatings are principally water-miscible. They are:
glycol ethers
glycol diethers
glycol ether acetates
ether alcohols
alcohols
ketones
N-alkyl-pyrrolidones The polyesters and phenolic resins are soluble in a variety of solvents.

The amount of cosolvent incorporated along with water may range from 20 to 65% of the total blend and preferably 20 to 50%. The cosolvent level is dependent on the amount and type of phenolic resin employed.

Use of Amines

The use of cosolvents in water as a blend alone does not solubilize these coating compositions, and so an additional adjuvant is needed, such as an amine, to render them watersoluble. The various amines reacct with the available carboxyl groups present in the oil-free polyester and with phenolic components to form salts that are soluble in water. These amines may be of the alkyl, alkanolamine, or morpholine types. In general, the tertiary amines are preferred because they effect faster cures and confer the least moisture sensitivity to the resultant baked film.

Typical examples of tertiary amines are:
triethyl amine
N,N-dimethyl ethanolamine
N,N-diethyl ethanolamine
2-dimethylamino-2-methyl-1-propanol
N-methyl diethanolamine
N-ethyl diethanolamine
triethanolamine A sufficient quantity of amine is employed to raise the pH of the aqueous solution to a range of 7-9 and preferably to 7.5-8.5.

A variety of methods may be employed to compound the coating. One technique is to admix all the components at ambient temperature. Another is to add to the warm polyester concentrate at 65-80% solids in a cosolvent which is at 120°-140° F., the cosolvent, amine and water in that order and to stir until homogeneity is obtained. This solution is cooled to 100°-120° F., and the phenolic solution at 50-80% solids in cosolvent is added first, followed by the addition of the triazine derivative. A third method is to add molten polyester slowly to a vessel containing a mixture of cosolvent, amine and water so that the final temperature does not exceed 160° F. This solution is then cooled to 100°-120° F., and the remaining curatives are added. The pH of the aqueous coating is finally adjusted to 7.5-8.5 with additional amine if necessary, and the product is then filtered using diatomaceous earth or other filter aid medium.

Coatings prepared from formulations produced in accordance with the foregoing description are characterized in that they are: (a) water-soluble upon neutralization with an amine and cosolvent, (b) heat-curable protective coatings having superior moisture resistance, relatively high bond strengths and good thermal resistance, and (c) multi-component mixtures containing oil-free polyester, phenolic and amino resins along with cosolvents, amines and water wherein the water content exceeds 25% of the total weight.

The varnishes of the invention are usually formed by admixing the following components at room or ambient temperature:

(a) polyester concentrate at about 80% solids in a glycol ether or other cosolvent
(b) phenolic resin solution at 70% to 82% solids in a glycol ether or other cosolvent
(c) aminoplast or triazine curative at 80-100% solids in a primary alcohol or water
(d) tertiary amine content may range from about 1.5 to 6% by weight of the varnish
(e) water content ranges from about 30 to 75% of the total volatile content consisting of water, cosolvent and amine
(f) cosolvent content ranges from about 20 to 65% of the total volatile content consisting of water, cosolvent and amine Heretofore aqueous coatings of either the emulsion or solution type employed as impregnating varnishes in electrical insulation applications as secondary insulation have exhibited serious deficiencies in moisture resistance. With the introduction of more stringent test methods for evaluating moisture resistance, many commercial aqueous coatings have not been acceptable vis-a-vis organic solvent-soluble types.

A similar test method as described in Laganis et al U.S. Application Ser. No. 934,795 now U.S. Pat. No. 4,196,109 was utilized in screening various coating candidates for moisture resistance. This test method for moisture resistance is conducted at 70° C. and 100% relative humidity with dew, and the results are reported as megohms of resistance after exposure to these test conditions for a period of one week, or 168 hours. Measurements on those coatings exceeding 20,000 megohms after this exposure period are deemed promising, and excellent when in excess of 100,000 megohms.

Tests for bond strengths were run on varnished helical coils as per ASTM-D 2519 using No. 18-H AWG copper wire coated with a Class H polyester topcoated with amide-imide. One coat of varnish was applied to the helical coil by dipping and baking it for 2 hours at 163° C. to obtain a one mil build of baked film. The coil was then reversed, dipped, and baked for a similar bake cycle. Bond strength tests were then run at 25° C. and 150° C. were of a much higher order than the majority of solvent-based varnishes. In fact, in certain instances bond strengths exceeded those for epoxy varnishes, that is, certain compositions of the invention exhibited really high bond strengths of 30-55 lbs. at 25° C. and 6-27 lbs. at 150° C.

The oil-free polyesters alone or in combination with the new water-dispersible phenolic resins, in the absence of the triazine component, were sluggish in cure, that is, deep dish samples (20 grams of varnish in an aluminum dish) did not completely cure after two hours at 163° C. Addition of triazine component to a combination of the polyester and phenolic resin produced compositions which cured in one hour or less at 163° C.

With the introduction of a combination of curing agents, such as a carboxylated phenolic resin and a triazine derivative, not only is the cure of the polyester compositions accelerated but also the effect on moisture resistance and bond strength of the polyester compositions is synergistic.

To obtain moisture resistance values in excess of 20,000 megohms after 168 hours of exposure at 70° C. and 100% humidity plus dew, and bond strengths at 150° C. in excess of 5 lbs., varnishes of the invention contain at least phenolic resin levels of 20%, preferably 27 to 57%, and triazine derivative levels of 5%, and preferably 8 to 18% (on total vehicle solids).

To demonstrate the critical amount of solubilizing reactants needed to obtain adequate aqueous solubility, storage stability, and the desired physical, chemical and electrical properties, Tables 4 and 5 present data on two different solubilizing reactants and various mole percents or, expressed in another way, mole or moles of solubilizing reactant per mole of aromatic dicarboxylic acid, such as isophthalic acid or terephthalic acid.

In Table 4 the effect of trimellitic anhydride (TMA) on varnish stability and properties of their baked films are presented.

Those varnishes having less than 14 mole % TMA in their polyester as demonstrated by Example 1 in Varnish No. 25 were unstable in aqueous solution form.

Those polyesters having TMA in a mole % range of 14-25 had aqueous solution stability throughout, but varied widely in their acceptable moisture resistance values. Those with 35% phenolic resin content (based on total vehicle solids) had values in excess of the established minimum of 25,000 megohms after 168 hours of exposure when the mole % of TMA in the polyester ranged from 17 to 22.5%. When the phenolic resin solids content is increased to 50% then the mole % of TMA is greatly extended from 14.1 to 25%.

TABLE 4

Effect of TMA Content on Moisture Resistance and Bond Strengths of Varnishes

| Varnish No. | 25 | 26 | 27 | 28 | 29 | 30 | 31 | 32 | 33 | 34 | 35 | 36 | 37 |
|---|---|---|---|---|---|---|---|---|---|---|---|---|---|
| Formulation | | | | | | | | | | | | | |
| Phenolic Solution of Ex. 20 | 264 | 328.6 | 469.4 | 286 | 421.2 | 257.3 | 398.2 | 287.4 | 410.6 | 287.4 | 410.6 | 287.4 | 427.4 |
| % NV in BE | 76.4 | 76.4 | 76.4 | 76.4 | 76.4 | 76.4 | 76.4 | 68.4 | 68.4 | 68.4 | 68.4 | 68.4 | 68.4 |
| HMMM | 86.4 | 98.3 | 98.3 | 93.6 | 96.6 | 84.2 | 91.3 | 84.2 | 84.2 | 84.2 | 84.2 | 84.2 | 87.8 |
| DMEA | 29 | 40.7 | 30.8 | 36 | 28 | 24 | 22.1 | 28 | 24 | 28 | 24 | 28 | 22.5 |
| Butoxy-ethanol (BE) | 44 | | | | | 45.2 | 28 | 55.2 | 16.5 | 31.6 | 2.7 | 47 | 18.2 |
| Water (Distilled) | 267.6 | 136.7 | 135.8 | 218.4 | 176.8 | 264.2 | 200.2 | 274.2 | 221.9 | 238.9 | 201.1 | 262 | 232.6 |
| Polyester Conc. of | | | | | | | | | | | | | |
| Ex. 1 (80% NV in BE) | 360 | | | | | | | | | | | | |
| Ex. 2 (80% NV in BE) | | 409.5 | 286.7 | | | | | | | | | | |
| Ex. 3 (80% NV in BE) | | | | 390 | 281.6 | | | | | | | | |
| Ex. 4 (80% NV in BE) | | | | | | 351 | 266.2 | | | | | | |
| Ex. 5 (80% NV in BE) | | | | | | | | 351 | 245.8 | | | | |
| Ex. 6 (80% NV in BE) | | | | | | | | | | 351 | 245.8 | | |
| Ex. 7 (80% NV in BE) | | | | | | | | | | | | 351 | 256 |
| Liquid Properties | | | | | | | | | | | | | |
| Visc. at 25° C. (G-H Scale) | S½ | U+ | 0 | S⅜ | R− | U¼ | U½ | 1¼ | 1½ | G¼ | H+ | G¼ | G½ |
| pH | 8.35 | 7.7 | 7.8 | 7.6 | 7.8 | 8.1 | 8.0 | 7.9 | 7.8 | 7.9 | 8.0 | 7.9 | 7.7 |
| % Solids | 55.1 | 64.6 | 64.2 | 61.0 | 62.1 | 54.7 | 60.5 | 52 | 56 | 55 | 58 | 53 | 56 |
| % Phenoplast (on total solids) | 35 | 35 | 50 | 35 | 50 | 35 | 50 | 35 | 50 | 35 | 50 | 35 | 50 |
| % Aminoplast (on Total Solids) | 15 | 15 | 15 | 15 | 15 | 15 | 15 | 15 | 15 | 15 | 15 | 15 | 15 |
| % Polyester (on Total Solids) | 50 | 50 | 35 | 50 | 35 | 50 | 35 | 50 | 35 | 50 | 35 | 50 | 35 |
| % Cosolvent as BE | 40 | 57 | 59.5 | 40 | 42.7 | 40 | 46.7 | 40 | 40 | 40 | 40 | 40 | 40 |
| Stability of Varnish | Separ. Overnight | OK | OK | OK | OK | OK | OK | OK | OK | OK | OK | OK | OK |
| Mol % TMA in Polyester | 11.1 | 14.1 | 14.1 | 17 | 17 | 19.5 | 19.5 | 22.5 | 22.5 | 22.5 | 22.5 | 25 | 25 |
| Mol TMA/Mol IPA in Polyester | 0.333/1 | 0.50/1 | 0.50/1 | 0.75/1 | 0.75/1 | 1/1 | 1/1 | 1.50/1 | 1.50/1 | 2/1 | 2/1 | 3/1 | 3/1 |
| Bond Strengths ASTMD-2519) on APR-2000 Helical Coils (AWG-18H) | | | | | | | | | | | | | |
| at 25° C. lbs. | | 26.0 | 40.4 | | 38.5 | 44.4 | 39.4 | 43.0 | 45.0 | 40.8 | 46.4 | 51.7 | 52.4 |
| at 150° C. lbs. | | 5.8 | 13.95 | | 5.5 | 5.5 | 16.6 | 9.7 | 20.4 | 9.9 | 21.4 | 23.0 | 31.1 |
| Moisture Resist. After 168 Hrs. Exp. at 70° C. and 100% R.H. + Dew Megohms | | 700 | 33,000 | 30,000 | 80,000 | 200,000 | 350,000 | 40,000 | 400,000 | 15,000 | 120,000 | 6,000 | 100,000 |

With respect to bond strengths lower values are obtained with varnishes having 35% phenolic resin solids ranging from 26 to 51.7 lbs. at 25° C., and especially the hot bonds from 5.5 to 23 lbs. at 150° C. Those varnishes having 50% phenolic solids content had slightly higher cold bond strengths ranging from 39.4 to 52.4 lbs. at 25° C., and, more importantly, much higher hot bond strengths ranging from 13.95 to 31.1 lbs.

Polyesters of examples 1 and 2 contained a triol, such as trimethylolpropane present, whereas polyesters of examples 3–7 with 17 mole percent TMA and higher did not contain any triol or higher polyhydric alcohol.

To demonstrate the effectiveness of another solubilizing reactant than an aromatic tricarboxylic acid anhydride, such as TMA, a cycloaliphatic dicarboxylic acid anhydride, data are presented in Table 5 on moisture resistance values and bond strengths of varnishes compounded with polyesters having varied tetrahydrophthalic anhydride (THPA) content.

some instances, the moisture resistance values of some polyesters prepared from THPA exceed those with TMA, while their bond strengths at similar mole % levels are quite comparable.

When TMA is replaced by tetracarboxylic acid anhydrides, such as benzophenone tetracarboxylic acid dianhydride (BPDA) and pyromellitic acid dianhydride (PMDA), at least one aromatic monocarboxylic acid is also employed to prepare polyesters of reduced reactivity. A comparison of varnish properties with these various polycarboxylic acid anhydrides is presented in Table 6.

A comparison of varnishes modified with 50% phenolic resin shows that TMA is far superior in maximizing moisture resistance compared to PMDA which is only fair and compared to BPDA which is poor. Their

TABLE 5

Effect of THPA Content on Moisture Resistance and Bond Strengths of Varnishes
Parts by Weight, grams

| Varnish No. | 38 | 39 | 40 | 41 | 42 | 43 | 44 | 45 | 46 | 47 |
|---|---|---|---|---|---|---|---|---|---|---|
| Formulation | | | | | | | | | | |
| Phenolic Solution of Ex. 20 | 18.7 | 26.7 | 236.7 | 236.7 | 265.3 | 405.8 | 236.7 | 405.75 | 236.7 | 405.75 |
| % NV in BE | 70.1 | 70.1 | 69.2 | 69.2 | 69.2 | 69.2 | 69.2 | 69.2 | 69.2 | 69.2 |
| HMMM | 3.74 | 5.62 | 70.2 | 70.2 | 52.4 | 84.3 | 70.2 | 84.3 | 70.2 | 84.3 |
| DMEA | 1.60 | 1.60 | 20.9 | 21.0 | 22.8 | 23.4 | 19.5 | 23.4 | 22.5 | 23.4 |
| Butoxyethanol (BE) | Prop. B 6.93 | Prop. B 3.95 | 31.7 | — | 29.1 | — | 32.7 | — | 32.7 | — |
| Water (Distilled) | 22.94 | 17.74 | 198.9 | 145.8 | 223.0 | 176.9 | 170.3 | 176.85 | 170.3 | 176.85 |
| Polyester Conc. of Ex. 8 (80% NV in BD) | 25.74 | 16.38 | | | | | | | | |
| Polyester Conc. of Ex. 9 (80% NV in BE) | | | 292.5 | 204.5 | | | | | | |
| Polyester Conc. of Ex. 10 (80% NV in BE) | | | | | 360.4 | 245.7 | | | | |
| Polyester Conc. of Ex. 11 (80% NV in BE) | 292.5 | 245.7 | | | | | | | | |
| Polyester Conc. of Ex. 12 (80% NV in BE) | | | 292.5 | 245.7 | | | | | | |
| Liquid Properties | | | | | | | | | | |
| Visc. at 25° C. (G-H Scale) | H | J | E½ | G½ | G½ | I½ | G¼ | H½ | E½ | G½ |
| pH | 8.0 | 8.1 | 7.9 | 8.2 | 8.0 | 8.2 | 7.8 | 8.2 | 7.9 | 8.1 |
| % Solids | 47 | 52 | 55 | 60 | 55 | 60 | 57 | 60 | 57 | 60 |
| % Phenoplast (on total solids) | 35 | 50 | 35 | 50 | 35 | 50 | 35 | 50 | 35 | 50 |
| % Aminoplast (on total solids) | 10 | 15 | 15 | 15 | 10 | 15 | 15 | 15 | 15 | 15 |
| % Polyester (on total solids) | 55 | 35 | 50 | 35 | 55 | 35 | 50 | 35 | 50 | 35 |
| Stability of Varnish | Cloudy & Unstable | Cloudy & Unstable | OK | OK | OK | OK | OK | OK | OK | OK |
| Mol % THPA in Polyester | 15.85 | 15.85 | 20.83 | 20.83 | 23.78 | 23.78 | 26.43 | 26.43 | 28.53 | 28.53 |
| Mol THPA/Mol IPA in Polyester | 0.50/1 | 0.50/1 | 0.75/1 | 0.75/1 | 1/1 | 1/1 | 1.25/1 | 1.25/1 | 1.50/1 | 1.50/1 |
| % Cosolvent | 40 | 40 | 40 | 40.9 | 40 | 40 | 43.6 | 40 | 43.6 | 40 |
| Bond Strengths (ASTMD-2519) on APR-2000 Helical Coils (AWG-18H) | | | | | | | | | | |
| at 25° C. lbs. | — | — | 36.4 | 44.0 | 38.2 | 49.4 | 42.0 | 48.0 | 44.8 | 49.0 |
| at 150° C. lbs. | — | — | 7.6 | 19.7 | 7.1 | 19.8 | 8.5 | 21.7 | 8.9 | 23.0 |
| Moisture Resist. After 168 Hrs. Exp. at 70° C. and 100% R.H. + Dew Megohms | | | 55,000 | 70,000 | 100,000 | 200,000 | 64,000 | 300,000 | 22,000 | 100,000 |

Unstable varnishes 38 and 39 were prepared with the polyester of example 8 having 15.85 mole % THPA or 0.50 mole THPA/mole of IPA. Polyesters having 20 to 30 mole % THPA or 0.75 to 1.50 mole THPA per mole of IPA provide stable varnishes which exhibit high orders of moisture resistance and bond strengths. In hot bond strengths are all high; with PMDA having a slight edge over the others.

Since the polyester of example 11 with THPA as the solubilizing cycloaliphatic diacid provided varnishes with good moisture resistance values and bond strength values, it was decided to study the effect of aliphatic dicarboxylic acid such as adipic acid and azelaic acid, on these same varnish properties, by replacing THPA with exact molar equivalents in the polyester of Example 11.

Polyesters of Examples 15 and 16 were prepared with adipic acid and azelaic acid, respectively, as the solubilizing reactant. Varnish formulations and their properties are presented in Table 7.

TABLE 6

Effect of TMA Replacement with Other Polycarboxylic Acid Anhydrides on Moisture Resistance and Bond Strengths of Varnishes

| | Parts by Weight, grams | | | |
|---|---|---|---|---|
| Varnish No. | 48 | 49 | 50 | 51 |
| Formulation | | | | |
| Phenolic solution of Ex. 20 | 257.3 | 398.2 | 405.75 | 405.75 |
| % NV in BE | 76.4 | 76.4 | 69.2 | 69.2 |
| HMMM | 84.2 | 91.3 | 84.3 | 84.3 |
| DMEA | 24 | 22.1 | 29.5 | 24 |
| Butoxyethanol | 45.2 | 28 | — | — |
| Water (Distilled) | 264.2 | 200.2 | 168.15 | 173.25 |
| Polyester Conc. of Ex. 4 (80% NV in BE) | 351 | 266.2 | | |
| Polyester Conc. of Ex. 13 (80% NV in BE) | | | 245.7 | |
| Polyester Conc. of Ex. 14 (80% NV in BE) | | | | 245.7 |

TABLE 6-continued

Effect of TMA Replacement with Other Polycarboxylic Acid Anhydrides on Moisture Resistance and Bond Strengths of Varnishes

| | Parts by Weight, grams | | | |
|---|---|---|---|---|
| Varnish No. | 48 | 49 | 50 | 51 |
| Liquid Properties | | | | |
| Visc. at 25° C. (G-H Scale) | U¼ | U½ | J½ | O |
| pH | 8.1 | 8.0 | 8.2 | 8.45 |
| % Solids | 54.7 | 60.5 | 60.2 | 60.2 |
| % Phenoplast (on total solids) | 35 | 50 | 50 | 50 |
| % Aminoplast (on total solids) | 15 | 15 | 15 | 15 |
| % Polyester (on total solids) | 50 | 35 | 35 | 35 |
| % Cosolvent as BE | 40 | 46.7 | 40 | 40 |
| Stability of Varnish | OK | OK | OK | OK |
| Mol % Polycarb. Anhyd. in Polyester | 19.5 | 19.5 | 13.56 | 13.56 |
| M. Polycarb. Anhyd./MIPA in Polyester | 1/1 | 1/1 | 1/1 | 1/1 |
| Bond Strengths (ASTM-D-2519) on APR-2000 Helical Coils (AWG-18H) | | | | |
| at 25° C. lbs. | 44.4 | 39.4 | 38.1 | 49.5 |
| at 150° C. lbs. | 5.5 | 16.6 | 16.4 | 22.7 |
| Moisture Resist. After 168 Hrs. Exp. at 70° C. and 100% R.H. + Dew Megohms | 200,000 | 350,000 | 20,000 | 80,000 |

TABLE 7

Effect of Aliphatic Diacids vs. Cycloaliphatic Type on Moisture Resistance and Bond Strengths of Varnishes

| | Parts by Weight, grams | | | | | | |
|---|---|---|---|---|---|---|---|
| Varnish No. | 52 | 53 | 54 | 55 | 56 | 57 | 58 |
| Formulation | | | | | | | |
| Phenolic Solution of Ex. 20 | 236.7 | 405.8 | 260.4 | 260.4 | 372 | 284 | 405.8 |
| % NV in BE | 69.2 | 69.2 | 69.2 | 69.2 | 69.2 | 69.2 | 69.2 |
| HMMM | 70.2 | 84.3 | 51.5 | 77.2 | 77.2 | 84.2 | 84.2 |
| DMEA | 19.5 | 23.4 | 22 | 22 | 22 | 30.3 | 23.1 |
| Butoxyethanol | 32.7 | — | — | — | — | 16.4 | — |
| Water (Distilled) | 170.3 | 176.8 | 219.5 | 219.5 | 161.5 | 206.3 | 136.6 |
| Polyester Conc. of Ex. 11 (80% NV in BE) | 292.5 | 245.7 | | | | | |
| Ex. 15 (80% NV in BE) | | | 353.9 | 321.8 | 225.3 | | |
| Ex. 16 (80% NV in BE) | | | | | | 315 | 245.8 |
| Liquid Properties | | | | | | | |
| Visc. at 25° C. (G-H Scale) | G¼ | H½ | H— | G¼ | H¾+ | G¾+ | I½ |
| pH | 7.8 | 8.2 | 8.2 | 8.2 | 8.3 | 8.2 | 8.05 |
| % Solids | 57 | 60.0 | 52.4 | 53.3 | 56.5 | 58 | 63 |
| % Phenoplast (on total solids) | 35 | 50 | 35 | 35 | 50 | 35 | 50 |
| % Aminoplast (on total solids) | 15 | 15 | 10 | 15 | 15 | 15 | 15 |
| % Polyester (on total solids) | 50 | 35 | 55 | 50 | 35 | 50 | 35 |
| % Cosolvent as BE | 43.6 | 40 | 40 | 40 | 40 | 40 | 40 |
| Stability of Varnish | OK | OK | OK | OK | OK | OK | OK |
| Mol. % Diacid in Polyester | 26.43 | 26.43 | 27.16 | 27.16 | 27.16 | 27.16 | 27.16 |

TABLE 7-continued

Effect of Aliphatic Diacids vs. Cycloaliphatic Type on Moisture Resistance and Bond Strengths of Varnishes Parts by Weight, grams

| Varnish No. | 52 | 53 | 54 | 55 | 56 | 57 | 58 |
|---|---|---|---|---|---|---|---|
| Mol diacid/Mol IPA in Polyester | 1.25/1 | 1.25/1 | 1.25/1 | 1.25/1 | 1.25/1 | 1.25/1 | 1.25/1 |
| Bond Strengths (ASTM D-2519) on APR-2000 Helical Coils (AWG-18H) | | | | | | | |
| at 25° C. lbs. | 42.0 | 48.0 | 40.0 | 52.4 | 51.4 | 49.4 | 52.8 |
| at 150° C. lbs. | 8.5 | 21.7 | 6.1 | 8.8 | 19.6 | 7.9 | 16.3 |
| Moisture Resist. After 168 Hrs. Exp. at 70° C. and 100% R.H. + Dew Megohms | 64,000 | 300,000 | 75 | 150 | 10,000 | 500 | 20,000 |

Varnishes containing adipic acid have very poor moisture resistance values at various phenolic and aminolast levels, whereas their bond strengths were all excellent. Those having azelaic acid fared slightly better in that varnish No. 58 with 50% phenolic resin had a moisture resistance value at the bare acceptable figure of 20,000 megohms, whereas the moisture resistance of varnish No. 57 with 35% phenolic resin was measured to be 500 megohms. Again, these varnishes had excellent bond strengths.

In an attempt to provide a varnish with greater toughness, and yet retain a high level of moisture resistance and bond strength, the polyester of example 3 was used as a model formulation for further modification. A series of polyesters were prepared wherein isophthalic acid was replaced by dimer acids at various mole percentages, as shown in polyester examples 17, 18 and 19 vs. 3. Dimer acids may be dimers of soybean, tall oil fatty acids or mixtures of those dimers. These polyesters had a combination of TMA and dimer acids as its solubilizing reactants. Their varnishes and properties are listed in Table 8.

TABLE 8

Effect of Dimer Acids on Moisture Resistance and Bond Strengths of Varnishes

| Varnish No. | 59 | 60 | 61 | 62 | 63 | 64 | 65 | 66 |
|---|---|---|---|---|---|---|---|---|
| Formulation | | | | | | | | |
| Phenolic solution of Ex. 20 | 286 | 421.3 | 275.4 | 410.6 | 311.2 | 410.5 | 275.4 | 410.6 |
| % NV in BE | 76.4 | 76.4 | 68.4 | 68.4 | 68.4 | 68.4 | 68.4 | 68.4 |
| HMMM | 93.6 | 96.6 | 80.7 | 84.2 | 91.3 | 84.2 | 80.7 | 84.2 |
| DMEA | 36.0 | 28.0 | 27.6 | 24.0 | 26 | 24 | 23 | 21.6 |
| Butoxyethanol | — | — | 54.4 | 26.2 | — | — | 54.3 | 24.8 |
| Water (Distilled) | 218.4 | 176.8 | 265.1 | 236.3 | 205.3 | 99.7 | 265.2 | 234.3 |
| Polyester Conc. of Ex. 3 (80% NV in BE) | 390 | 281.6 | | | | | | |
| Polyester Conc. of Ex. 17 (80% NV in BE) | | | 336/4 | 245.8 | | | | |
| Polyester Conc. of Ex. 18 (80% NV in BE) | | | | | 380.3 | 245.6 | | |
| Polyester Conc. of Ex. 19 (80% NV in BE) | | | | | | | 336.4 | 245.8 |
| Liquid Properties | | | | | | | | |
| Visc. at 25° C. (G-H Scale) | S¾ | R— | I¼ | G½ | V½ | U | H— | H |
| pH | 7.6 | 7.8 | 7.7 | 7.9 | 7.9 | 8.0 | 8.2 | 7.7 |
| % Solids | 61 | 62.1 | 52 | 55 | 60 | 65 | 52 | 55 |
| % Cosolvent | 40 | 42.7 | 40 | 40 | 40 | 54 | 40 | 40 |
| % Phenoplast (on total solids) | 35 | 50 | 35 | 50 | 35 | 50 | 35 | 50 |
| % Aminoplast (on total solids) | 15 | 15 | 15 | 15 | 15 | 15 | 15 | 15 |
| % Polyester (on total solids) | 50 | 35 | 50 | 35 | 50 | 35 | 50 | 35 |
| Stability of Varnish | OK | OK | OK | OK | OK | OK | OK | OK |
| Mol % Replacement of IPA w. Dimer Acids | 0 | 0 | 20 | 20 | 30 | 30 | 40 | 40 |
| Mol % Dimer acid in Polyester | 0 | 0 | 3.9 | 3.9 | 7.2 | 7.2 | 8.9 | 8.9 |

TABLE 8-continued

Effect of Dimer Acids on Moisture Resistance and Bond Strengths of Varnishes

| Varnish No. | 59 | 60 | 61 | 62 | 63 | 64 | 65 | 66 |
|---|---|---|---|---|---|---|---|---|
| Mol Dimer Acids/ Mol IPA in Polyester | 0 | 0 | 0.25/1 | 0.25/1 | 0.429/1 | 0.429/1 | 0.67/1 | 0.67/1 |
| Mol % TMA in Polyester | 17 | 17 | 19.5 | 19.5 | 16.8 | 16.8 | 16.6 | 16.6 |
| Bond Strength | | | | | | | | |
| (ASTMD-2519) on APR-2000 Helical Coils (AWG-18H) | | | | | | | | |
| at 25° C. lbs. | — | 38.5 | 43.5 | 49.7 | 46.8 | 50.9 | 49.9 | 55.4 |
| at 150° C. lbs. | — | 5.5 | 7.6 | 18.2 | 8.6 | 17.4 | 12.0 | 22.9 |
| Moisture Resist. | | | | | | | | |
| After 168 Hrs. Exp. at 70° C. and 100% R.H. + Dew Megohms | 30,000 | 80,000 | 100,000 | 234,000 | 50,000 | 350,000 | 50,000 | 500,000 |

At the 30 and 40 mole % replacement of isophthalic acid with dimer acids in varnishes 65 and 67, slightly better moisture values of 50,000 megohms for both with 35% phenolic resin modification were realized compared to a moisture resistance value of 30,000 for varnish No. 59, the control. At the 20% level a much better value of 100,000 megohms was obtained. All had good bond strengths and toughness. Those varnishes with 50% phenolic resin surpassed the model varnish in moisture resistance, bond strengths and toughness.

A comparison of aqueous coating compositions comprised of various phenolic resins compounded with a specific polyester, and a triazine derivative as to bond strengths and moisture resistance values are presented in Tables 9, 10 and 11. All the varnishes, save varnish No. 73 based on the polymer of example 23, exceeded the minimum moisture of 20,000 megohms after 168 hours of exposure. Those varnishes in Table 10 with the polyester of example 11 had better moisture resistance values than those polyesters 10 and 12.

TABLE 9

Effect of Various Phenolic Resins with a Specific Polyester on Moisture Resistance and Bond Strengths

| Varnish No. | 67 | 68 | 69 | 70 | 71 | 72 | 73 |
|---|---|---|---|---|---|---|---|
| Formulation | | | | | | | |
| Polyester Conc. of Ex. 10 | 360.4 | 245.7 | 184.3 | 184.3 | 225.3 | 235.5 | 307.2 |
| HMMM | 52.4 | 84.3 | 63.2 | 63.2 | 77.2 | 80.7 | 73.7 |
| DMEA | 22.8 | 23.4 | 13.5 | 16.5 | 22.5 | 24.3 | 27.0 |
| Butoxyethanol | 29.1 | — | 3.8 | 15.7 | — | 29.2 | 52.9 |
| Water | 223.0 | 176.9 | 126.0 | 160.4 | 196.0 | 205.0 | 229.3 |
| Phenolic solution of Ex. 20 | 265.3 | 405.8 | | | | | |
| Phenolic solution of Ex. 21 | | | 276.8 | | | | |
| Phenolic solution of Ex. 22 | | | | 265 | | | |
| Phenolic solution of Ex. 23 | | | | | 343.2 | | |
| Phenolic solution of Ex. 24 | | | | | | 329.3 | 210.4 |
| Liquid Properties | | | | | | | |
| Visc. at 25° C. (G-H Scale) | G½ | I½ | G¾ | I½ | F+ | G½ | F½ |
| pH | 8.0 | 8.2 | 8.0 | 8.3 | 8.1 | 7.8 | 8.2 |
| % Solids | 55 | 60 | 63.1 | 60 | 60 | 60 | 55 |
| % Cosolvent | 40 | 40 | 40 | 40 | 40 | 40 | 40 |
| % Phenoplast (on total solids) | 35 | 50 | 50 | 50 | 50 | 50 | 35 |
| % Aminoplast (on total solids) | 10 | 15 | 15 | 15 | 15 | 15 | 15 |
| % Polyester (on total solids) | 55 | 35 | 35 | 35 | 35 | 35 | 50 |
| Stability of Varnish | OK | OK | OK | OK | OK | OK | OK |
| Bond Strengths | | | | | | | |
| (ASTM D-2519) on APR 2000 Helical Coils (AWG-18H) | | | | | | | |
| at 25° C. lbs. | 38.2 | 49.4 | 39.4 | 35.8 | 41.3 | 33.9 | 37.0 |
| at 150° C. lbs. | 7.1 | 19.8 | 14.7 | 17.3 | 8.9 | 14.8 | 7.9 |
| Moist Resist. | | | | | | | |
| After 160 Hrs. Exp. | | | | | | | |

TABLE 9-continued

Effect of Various Phenolic Resins with a Specific Polyester on Moisture Resistance and Bond Strengths

| Varnish No. | 67 | 68 | 69 | 70 | 71 | 72 | 73 |
|---|---|---|---|---|---|---|---|
| at 70° C. and 100% R.H. + Dew Megohms | 100,000 | 200,000 | 82,000 | 30,000 | 4,200 | No Test-Poor Coatability on Copper Panel | No Test-Poor Coatability on Copper Panel |

TABLE 10

Effect of Various Phenolic Resins with a specific Polyester on Moisture Resistance and Bond Strengths

| Varnish No. | 74 | 75 | 76 | 77 | 78 |
|---|---|---|---|---|---|
| Formulation | | | | | |
| Polyester Conc. of Ex. 11 | 245.7 | 292.5 | 256 | 256 | 256 |
| HMMM | 84.3 | 70.2 | 87.8 | 87.8 | 87.8 |
| DMEA | 23.4 | 19.5 | 20.8 | 24.8 | 20.8 |
| Butoxyethanol | — | 32.7 | 5.3 | 21.8 | — |
| Water | 176.9 | 170.3 | 222.8 | 222.8 | 222.5 |
| Phenolic soln. of Ex. 20 | 405.8 | 236.7 | | | |
| Phenolic soln. of Ex. 21 | | | 384.5 | | |
| Phenolic soln. of Ex. 22 | | | | 368 | |
| Phenolic soln. of Ex. 23 | | | | | 390 |
| Liquid Properties | | | | | |
| Visc. at 25° C. (G-H Scale) | H½ | G¼ | F¼ | I¼ | G¼ |
| pH | 8.2 | 7.8 | 7.8 | 8.0 | 7.8 |
| % Solids | 60 | 57 | 60 | 60 | 60 |
| % Cosolvent | 40 | 43.6 | 40 | 40 | 40 |
| % Phenoplast (on total solids) | 50 | 35 | 50 | 50 | 50 |
| % Aminoplast (on total solids) | 15 | 15 | 15 | 15 | 15 |
| % Polyester (on total solids) | 35 | 50 | 35 | 35 | 35 |
| Stability of Varnish | OK | OK | OK | OK | OK |
| Bond Strengths (ASTMD-2519) on APR-2000 Helical Coils (AWG-18H) | | | | | |
| at 25° C. lbs. | 48.0 | 42.0 | 37.5 | 36.6 | 48.9 |
| at 150° C. lbs. | 21.7 | 8.5 | 16.7 | 16.7 | 13.4 |
| Moisture Resist. After 168 Hrs. Exp. at 70° C. and 100% R.H. + Dew Megohms | 300,000 | 64,000 | 350,000 | 68,000 | 150,000 |

TABLE 11

Effect of Various Phenolic Resins with a Specific Polyester on Moisture Resistance and Bond Strengths

| Varnish No. | 79 | 80 | 81 | 82 | 83 |
|---|---|---|---|---|---|
| Formulation | | | | | |
| Polyester Conc. of Ex. 12 | 245.7 | 292.5 | 256 | 256 | 256 |
| HMMM | 84.3 | 70.2 | 87.8 | 87.8 | 87.8 |
| DMEA | 23.4 | 22.5 | 22.3 | 25.8 | 23.8 |
| Butoxyethanol | — | 32.7 | 5.3 | 21.8 | — |
| Water | 176.9 | 170.3 | 190 | 222.8 | 190 |
| Phenolic soln. of Ex. 20 | 405.8 | 236.7 | | | |
| Phenolic soln. of Ex. 21 | | | 384.5 | | |
| Phenolic soln. of Ex. 22 | | | | 368 | |
| Phenolic soln. of Ex. 23 | | | | | 390 |
| Liquid Properties | | | | | |
| Visc. at 25° C. (G-H Scale) | G½ | E½ | G¼ | I | H+ |
| pH | 8.1 | 7.9 | 8.0 | 8.0 | 7.8 |
| % Solids | 60 | 57 | 60 | 60 | 60 |
| % Cosolvent | 40 | 43.6 | 43.9 | 40 | 43.8 |
| % Phenoplast (on total solids) | 50 | 35 | 50 | 50 | 50 |
| % Aminoplast (on total solids) | 15 | 15 | 15 | 15 | 15 |
| % Polyester (on total solids) | 35 | 50 | 35 | 35 | 35 |
| Stability of Varnish | OK | OK | OK | OK | OK |
| Bond Strengths (ASTM D-2519) on APR 2000 Helical Coils (AWG-18H) | | | | | |
| at 25° C. lbs. | 49.0 | 44.8 | 35.6 | 31.6 | 44.2 |
| at 150° C. lbs. | 23.0 | 8.9 | 17.2 | 14.7 | 12.2 |
| Moisture Resist. After 168 Hrs. Exp. at 70° C. and 100% R.H. + Dew Megohms | 100,000 | 22,000 | 90,000 | 50,000 | 90,000 |

What is claimed is:

1. A composition comprising a modified oil-free and fatty acid-free polyester comprising
   25 to 65 weight percent of an oil-free or a fatty acid-free polyester;
   27 to 57 weight percent of a phenolic resin, and
   8 to 18 weight percent of a triazine derivative or triazine resin,
   wherein the phenolic resin is the condensation product of formaldehyde with a mixture of
   (1) an ortho- or para- substituted phenol selected from the group consisting of alkyl substituted phenols and aryl substituted phenols, wherein said alkyl contains 1 to 12 carbon atoms which is present in an amount ranging from 50 to 90 mole percent of said mixture;
   (2) a polyhydroxy phenol is present in an amount ranging from 3 to 20 mole percent of said mixture; and (3) an orthohydroxybenzoic acid, a parahydroxybenzoic acid or an admixture thereof and is present in an amount ranging from 7 to 40 mole percent of said mixture, wherein the triazine derivative is the reaction product of a melamine or benzoguanamine and formaldehyde and contains at least two free methylol groups or at least one ether derivative of at least one of said methylol groups; at least one condensation product of said derivative; or admixtures thereof wherein heat treatment of said composition at a temperature to cure it results in a produce which exhibits a moisture resistance of at least 25,000 megohms.

2. The composition of claim 1, wherein said polyester is formed from a reaction mixture which contains trimellitic anhydride in an amount greater than 14 mole percent based on all reactants used to form the polyester.

3. The composition of claim 2, wherein the polyester is the reaction product of isophthalic acid and neopentyl glycol, trimethylolpropane or mixtures thereof.

4. The composition of claim 2, wherein said amount of trimellitic anhydride exceeds 17 mole percent.

5. The composition of claim 4, wherein said reaction mixture contains diols and is free of polyols.

6. An aqueous varnish containing water in an amount which exceeds 25% by weight of the varnish and the composition of claim 1.

7. An aqueous varnish containing water in an amount which exceeds 25% by weight of the varnish and the composition of claim 4.

8. An aqueous varnish containing water in an amount which exceeds 25% by weight of said varnish and the composition of claim 5.

9. The composition of claim 1, wherein said polyester is formed from a reaction mixture which contains a cycloaliphatic dicarboxylic acid, its anhydride, aliphatic saturated dicarboxylic acid and a triol.

10. The composition of claim 1, wherein said polyester is formed from a reaction mixture which includes a tetracarboxylic acid dianhydride and an arylmonocarboxylic acid.

11. The composition of claim 1, wherein said polyester is formed from a reaction mixture which contains an aliphatic dicarboxylic acid or its anhydride and a triol.

12. The composition of claim 11, wherein said reaction mixture further includes trimellitic anhydride or tetrahydrophthalic anhydride.

13. An aqueous varnish containing water in an amount which exceeds 25% by weight of the varnish and the composition of claim 9 in solution.

14. An aqueous varnish containing water in an amount which exceeds 25% by weight of the varnish and the composition of claim 10 in solution.

15. An aqueous varnish containing water in an amount which exceeds 25% by weight of the varnish and the composition of claim 11 in solution.

* * * * *